(12) United States Patent
Collins (10) Patent No.: US 12,488,950 B1
(45) Date of Patent: Dec. 2, 2025

(54) REMOTE CONTROL HOLDER

(71) Applicant: William Rene'a Collins, Birmingham, AL (US)

(72) Inventor: William Rene'a Collins, Birmingham, AL (US)

( * ) Notice: Subject to any disclaimer, the term of this patent is extended or adjusted under 35 U.S.C. 154(b) by 0 days.

(21) Appl. No.: 18/773,715

(22) Filed: Jul. 16, 2024

(51) Int. Cl.
*H01H 9/02* (2006.01)
*F16B 2/22* (2006.01)

(52) U.S. Cl.
CPC ............... *H01H 9/025* (2013.01); *F16B 2/22* (2013.01); *H01H 2009/0257* (2013.01)

(58) Field of Classification Search
CPC .... H01H 9/025; H01H 2009/0257; F16B 2/22
See application file for complete search history.

(56) References Cited

U.S. PATENT DOCUMENTS

| | | | |
|---|---|---|---|
| 4,838,505 A | 6/1989 | Lowe | |
| 4,852,746 A * | 8/1989 | Wells | F16M 11/041 |
| | | | 211/26.1 |
| 4,856,658 A * | 8/1989 | Novak | F16M 11/22 |
| | | | 211/26.1 |
| 4,991,892 A | 2/1991 | Burrell | |
| D326,196 S * | 5/1992 | Shikoff | D6/680.1 |
| 5,244,173 A | 9/1993 | Kulyk | |
| 5,480,115 A * | 1/1996 | Haltof | F16M 11/041 |
| | | | 248/221.11 |
| 5,531,332 A * | 7/1996 | Monnens | H01H 9/025 |
| | | | 211/DIG. 1 |
| 5,903,645 A * | 5/1999 | Tsay | B60R 11/0241 |
| | | | 248/316.4 |
| 5,954,208 A | 9/1999 | Schultz | |
| 6,585,212 B2 * | 7/2003 | Carnevali | B60R 11/0252 |
| | | | 312/319.1 |
| D532,995 S * | 12/2006 | Dorazio | D6/680.1 |
| D537,273 S | 2/2007 | Gionet | |
| 7,551,458 B2 * | 6/2009 | Carnevali | H04M 1/04 |
| | | | 361/807 |
| 9,568,148 B2 * | 2/2017 | Carnevali | F16M 13/00 |
| 10,330,251 B2 * | 6/2019 | Carnevali | F16M 13/022 |
| 10,608,384 B2 * | 3/2020 | Warren | H01R 31/065 |
| D953,784 S | 6/2022 | Blyth | |
| 11,598,355 B1 * | 3/2023 | Yu | H04M 1/04 |
| 2010/0301183 A1 * | 12/2010 | Carnevali | F16B 5/0635 |
| | | | 248/346.06 |
| 2014/0034586 A1 * | 2/2014 | Eaton | H01H 9/025 |
| | | | 211/26.1 |
| 2017/0188724 A1 * | 7/2017 | Lin | F16M 13/00 |

FOREIGN PATENT DOCUMENTS

| | | | |
|---|---|---|---|
| AU | 2018203731 A1 * | 12/2018 | |
| AU | 2018203731 | 6/2023 | |

* cited by examiner

*Primary Examiner* — Ko H Chan (57) ABSTRACT

The remote control holder is a mechanical device. The remote control holder is a handheld device. The remote control holder is configured for use with a plurality of remote control devices. The plurality of remote control devices removably attach to the remote control holder. The remote control holder stores the plurality of remote control devices such that the interface of each remote control selected from the plurality of control devices is accessible from the environment. The remote control holder incorporates a base disk structure and a plurality of clip structures. The plurality of clip structures removably attach the plurality of remote control devices to the base disk structure.

5 Claims, 6 Drawing Sheets

REMOTE CONTROL HOLDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The remote control holder is a mechanical device. The remote control holder is a handheld device. The remote control holder is configured for use with a plurality of remote control devices. The plurality of remote control devices removably attach to the remote control holder. The remote control holder stores the plurality of remote control devices such that the interface of each remote control selected from the plurality of control devices is accessible from the environment. The remote 19 control holder comprises a base disk structure and a plurality of clip structures. The plurality of clip structures removably attach the plurality of remote control devices to the base disk structure.

These together with additional objects, features and advantages of the remote control holder will be readily apparent to those of ordinary skill in the art upon reading the following detailed description of the presently preferred, but nonetheless illustrative, embodiments when taken in conjunction with the accompanying drawings.

In this respect, before explaining the current embodiments of the remote control holder in detail, it is to be understood that the remote control holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the remote control holder.

It is therefore important that the claims be regarded as including such equivalent construction insofar as they do not depart from the spirit and scope of the remote control holder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The remote control holder 100 (hereinafter invention) is a mechanical device. The invention 100 is a handheld device. The invention 100 is configured for use with a plurality of remote control devices 180. The plurality of remote control devices 180 removably attach to the invention 100. The invention 100 stores the plurality of remote control devices 180 such that the interface of each remote control selected from the plurality of control devices 180 is accessible from the environment. The invention 100 comprises a base disk structure 101 and a plurality of clip structures 102. The plurality of clip structures 102 removably attach the plurality of remote control devices 180 to the base disk structure 101.

Figure 1:
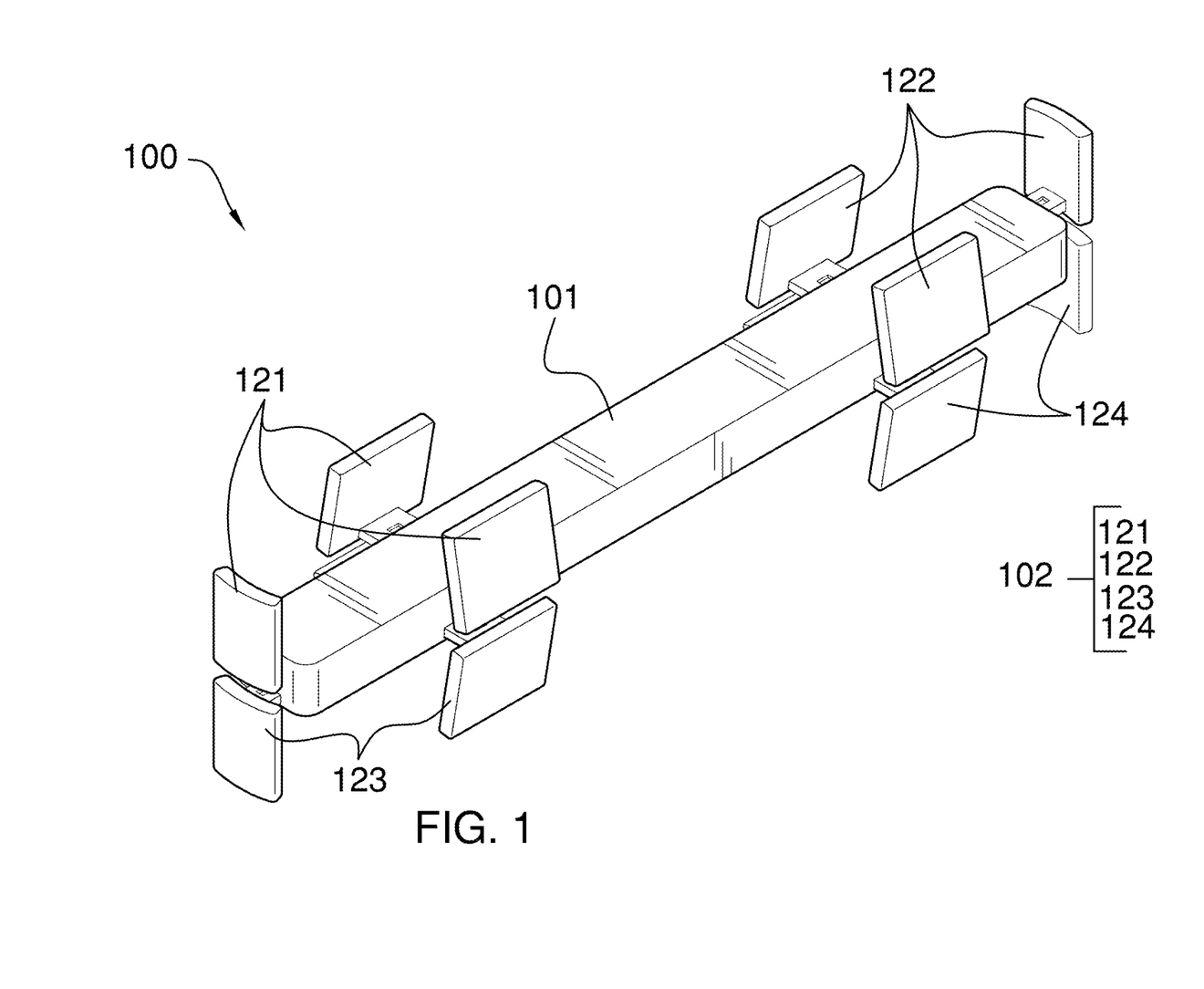
FIG. 1 is a perspective view of an embodiment of the disclosure.
Figure 2:
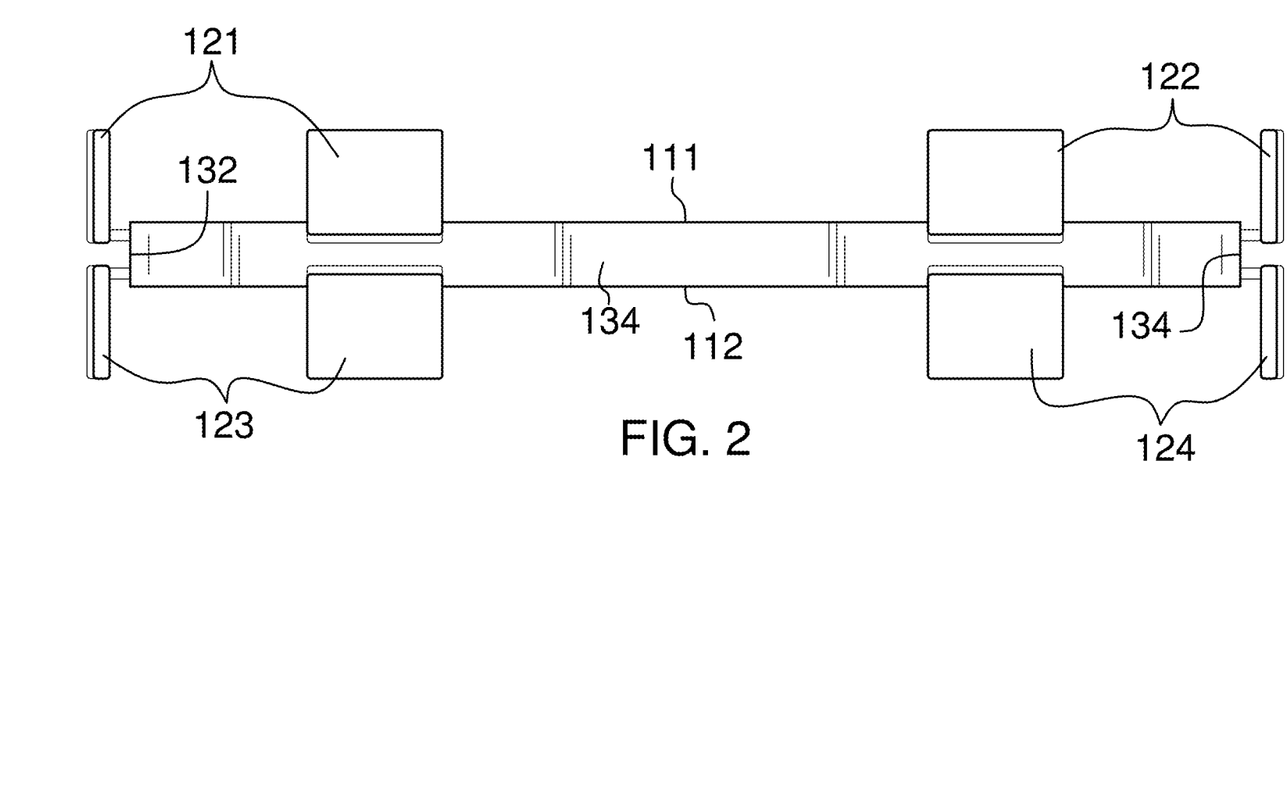
FIG. 2 is a front view of an embodiment of the disclosure.
Figure 6:
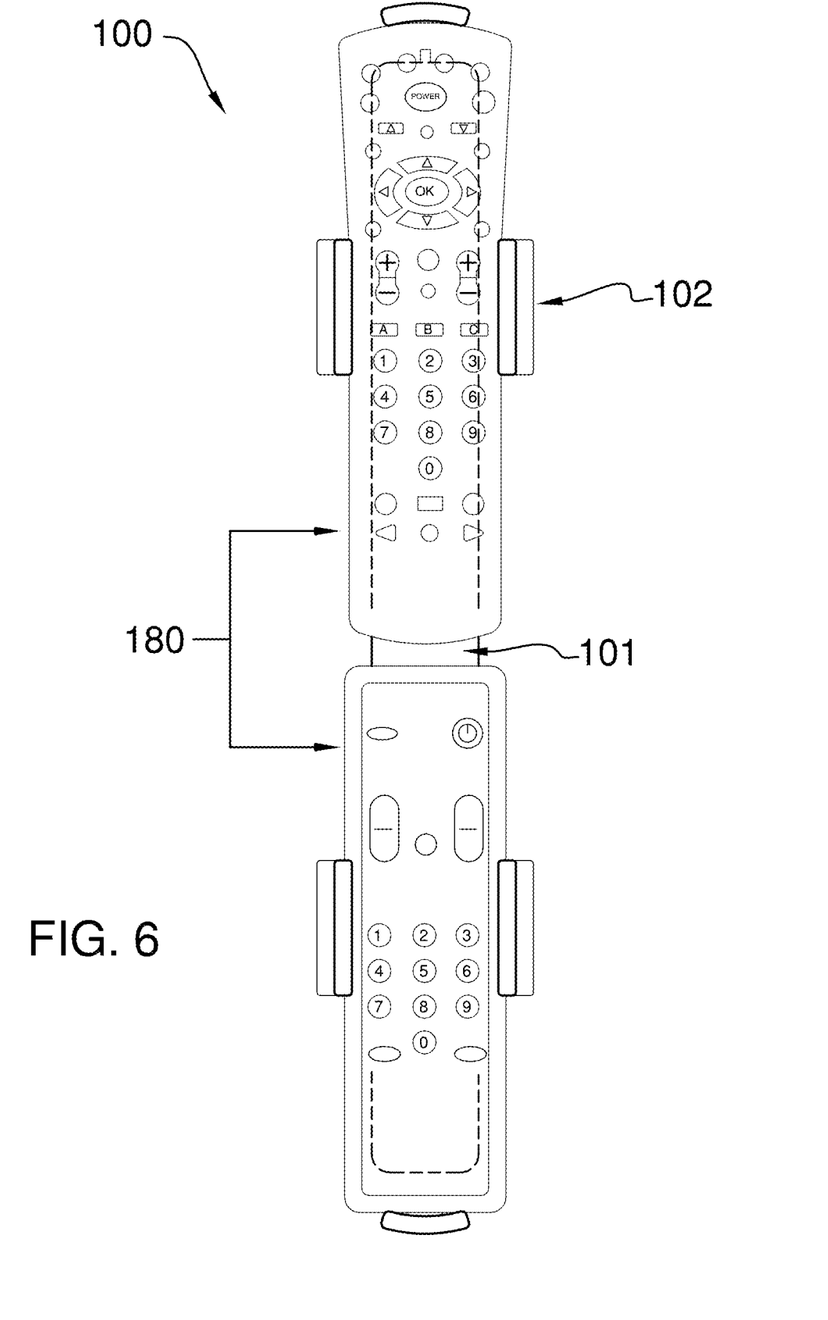
FIG. 6 is an in-use view of an embodiment of the disclosure.

Each individual remote control device selected from the plurality of remote control devices 180 is an auxiliary electric device. Each selected individual remote control device is used to remotely control a primary electric device that is associated with the selected individual remote control device. Each individual remote control device selected from the plurality of remote control devices 180 attaches to the base disk structure 101 using an individual clip structure selected from the plurality clip structures 102.

The base disk structure 101 is the primary structure of the invention 100. The plurality of clip structures 102 mount on the base disk structure 101. The plurality of clip structures removably attach the plurality of remote control devices 180 to the base disk structure 101. The base disk structure 101 is a prism shaped structure. The base disk structure 101 has a disk shape. The base disk structure 101 is a rigid structure. The base disk structure 101 has a rectangular block shape. The base disk structure 101 comprises a first face 111, a second face 112, and a plurality of lateral faces 113.

The first face 111 is a congruent end of the disk shape of the base disk structure 101. The first face 111 forms the face of the base disk structure 101 with the greatest surface area. Up to two individual remote control devices selected from the plurality of remote control devices 180 that are attached to the base disk structure 101 are placed against the first face 111.

Figure 5:
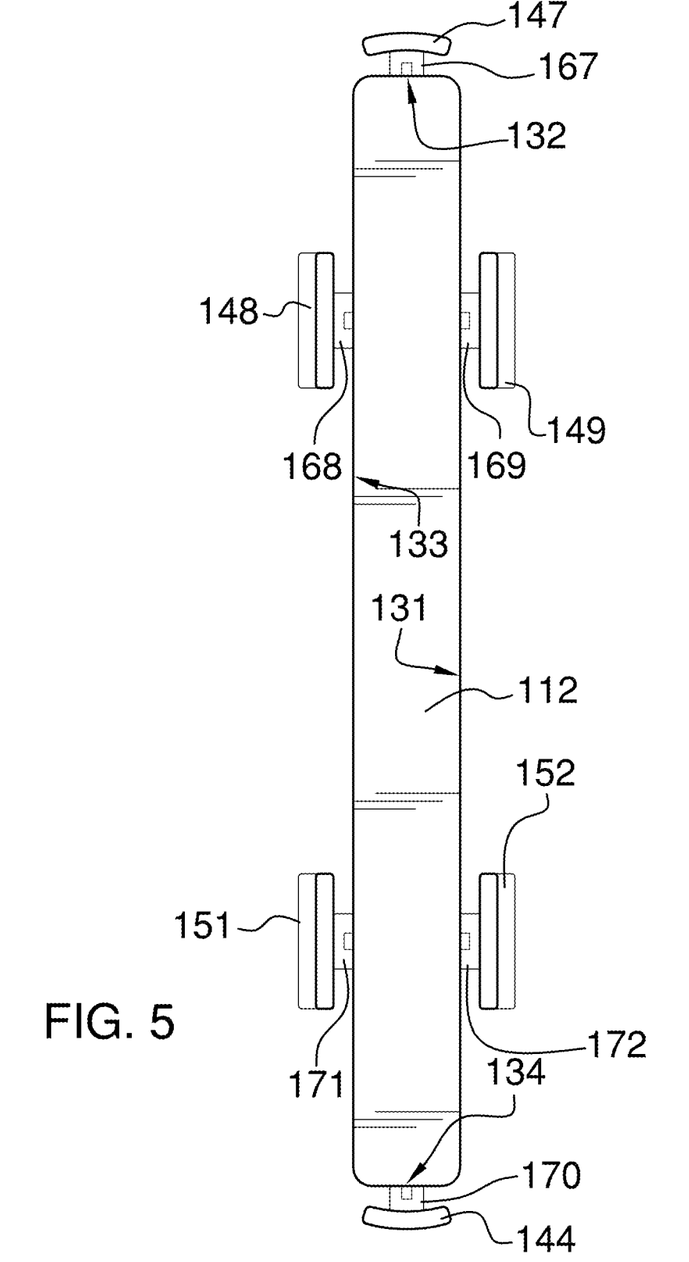
FIG. 5 is a bottom view of an embodiment of the disclosure.

The second face 112 is a congruent end of the disk shape of the base disk structure 101. The second face 112 forms the face of the base disk structure 101 that is distal from the first face 111. Up to two individual remote control devices selected from the plurality of remote control devices 180 that are attached to the base disk structure 101 are placed against the second face 112.

Figure 3:
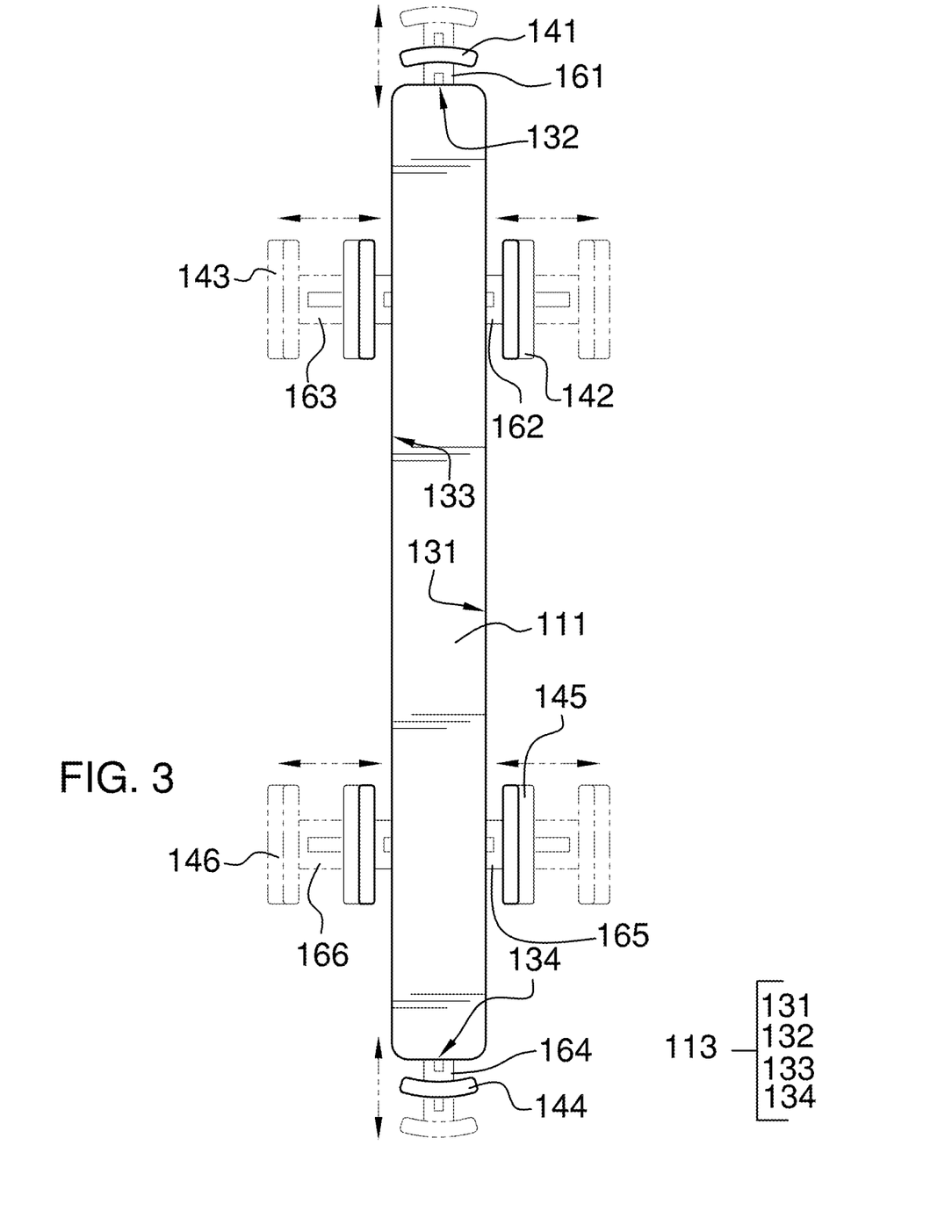
FIG. 3 is a top view of an embodiment of the disclosure.
Figure 4:
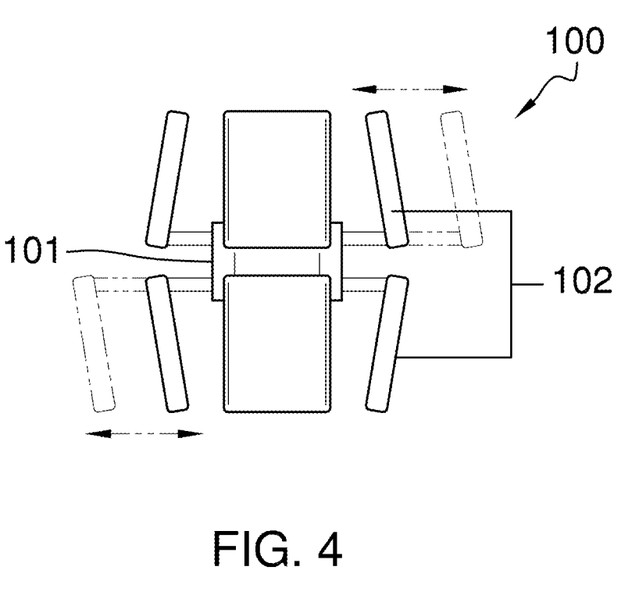
FIG. 4 is a side view of an embodiment of the disclosure.

The plurality of lateral faces 113 forms the lateral face of the disk shape of the base disk structure 101. The plurality of lateral faces 113 further comprises a first lateral face 131, a second lateral face 132, a third lateral face 133, and a fourth lateral face 134.

The first lateral face 131 is a lateral face of the disk structure of the base disk structure 101. The first lateral face 131 is the lateral face of the base disk structure 101 with the greatest surface area. The first lateral face 131 runs parallel with the major axis of the base disk structure 101.

The second lateral face 132 is a lateral face of the disk structure of the base disk structure 101. The second lateral face 132 is the lateral face of the base disk structure 101 with the least surface area. The second lateral face 132 runs perpendicular to the major axis of the base disk structure 101.

The third lateral face 133 is a lateral face of the disk structure of the base disk structure 101. The third lateral face 133 is the lateral face selected from the plurality of lateral faces 113 that is distal from the first lateral face 131. The third lateral face 133 runs parallel with the major axis of the base disk structure 101.

The fourth lateral face 134 is a lateral face of the disk structure of the base disk structure 101. The fourth lateral face 134 is the lateral face selected from the plurality of lateral faces 113 that is distal from the second lateral face 132. The fourth lateral face 134 runs perpendicular to the major axis of the base disk structure 101.

The plurality of clip structures 102 comprises a collection of individual clip structures. Each individual clip structure selected from the plurality of clip structures 102 is a fastening device. Each selected individual clip structure is a clip. Each selected individual clip structure is associated with an individual remote control device selected from the plurality of remote control devices 180. Each selected 13 individual clip structure secures its associated individual remote control device to the base disk structure 101. Each individual remote control device selected from the plurality of remote control devices 180 inserts into its associated individual clip structure with a tight fit. Each selected individual clip structure detachably attaches its associated individual remote control device to the base disk structure 101. The plurality of clip structures 102 comprises a first clip structure 121, a second clip structure 122, a third clip structure 123, and a fourth clip structure 124.

The first clip structure 121 is an individual clip structure selected from the plurality of clip structures 102. The first clip structure 121 is associated with an individual remote control device selected from the plurality of remote control devices 180. The first clip structure 121 is a friction based structure that clips its associated individual remote control device to the first face 111 of the base disk structure 101. The first clip structure 121 comprises a first clip plate 141, a second clip plate 142, a third clip plate 143, a first clip arm 161, a second clip arm 162, and a third clip arm 163.

The first clip plate 141 is a roughly disk shaped structure. The first clip plate 141 is a rigid structure. The first clip plate 141 forms a stop structure. The first clip plate 141 prevents the individual remote control device associated with the first clip structure 121 from shifting off the first face 111 in a direction parallel to the major axis of the base disk structure 101. The first clip plate 141 attaches to the base disk structure 101 such that the congruent ends of the disk structure of the first clip plate 141 are roughly perpendicular to the major axis of the base disk structure 101. The first clip plate 141 is the clip plate of the first clip structure 121 that is proximal to the second lateral face 132 of the base disk structure 101.

The second clip plate 142 is a roughly disk shaped structure. The second clip plate 142 is a rigid structure. The second clip plate 142 forms a stop structure. The second clip plate 142 prevents the individual remote control device associated with the first clip structure 121 from shifting off the first face 111 in a direction parallel to the minor axis of the base disk structure 101. The second clip plate 142 presses against the associated individual remote control device such that a friction is formed between the first clip structure 121 and the associated individual remote control device. The friction between the second clip plate 142 and the associated individual remote control device prevents the associated individual remote control device form shifting along the first face 111 in a direction parallel to the major axis of the base disk structure 101. The second clip plate 142 attaches to the base disk structure 101 such that the congruent ends of the disk structure of the second clip plate 142 are roughly perpendicular to the minor axis of the base disk structure 101. The second clip plate 142 is the clip plate of the first clip structure 121 that is proximal to the first lateral face 131 of the base disk structure 101.

The third clip plate 143 is a roughly disk shaped structure. The third clip plate 143 is a rigid structure. The third clip plate 143 forms a stop structure. The third clip plate 143 prevents the individual remote control device associated with the first clip structure 121 from shifting off the first face 111 in a direction parallel to the minor axis of the base disk structure 101. The third clip plate 143 presses against the associated individual remote control device such that a friction is formed between the first clip structure 121 and the associated individual remote control device. The friction between the third clip plate 143 and the associated individual remote control device prevents the associated individual remote control device form shifting along the first face 111 in a direction parallel to the major axis of the base disk structure 101. The third clip plate 143 attaches to the base disk structure 101 such that the congruent ends of the disk structure of the third clip plate 143 are roughly perpendicular to the minor axis of the base disk structure 101. The third clip plate 143 is the clip plate of the first clip structure 121 that is proximal to the third lateral face 133 of the base disk structure 101.

The first clip arm 161 is a prism shaped structure. The first clip arm 161 is a rigid structure. The first clip arm 161 is a spring loaded structure. The first clip arm 161 attaches the first clip plate 141 to the second lateral face 132 of the base disk structure 101. The first clip arm 161 attaches to the first clip plate 141 such that the first clip arm 161 deforms as the span of the distance between the first clip plate 141 and the second lateral face 132 increases.

The second clip arm 162 is a prism shaped structure. The second clip arm 162 is a rigid structure. The second clip arm is a spring loaded structure. The second clip arm 162 attaches the second clip plate 142 to the first lateral face 131 of the base disk structure 101. The second clip arm 162 attaches to the second clip plate 142 such that the second clip arm 162 deforms as the span of the distance between the second clip plate 142 and the first lateral face 131 increases.

The third clip arm 163 is a prism shaped structure. The third clip arm 163 is a rigid structure. The third clip arm 163 is a spring loaded structure. The third clip arm 163 attaches the third clip plate 143 to the third lateral face 133 of the base disk structure 101. The third clip arm 163 attaches to the third clip plate 143 such that the third clip arm 163 deforms as the span of the distance between the third clip plate 143 and the third lateral face 133 increases.

The second clip structure 122 is an individual clip structure selected from the plurality of clip structures 102. The second clip structure 122 is associated with an individual remote control device selected from the plurality of remote control devices 180. The second clip structure 122 is a friction based structure that clips its associated individual remote control device to the first face 111 of the base disk structure 101. The second clip structure 122 comprises a fourth clip plate 144, a fifth clip plate 145, a sixth clip plate 146, a fourth clip arm 164, a fifth clip arm 165, and a sixth clip arm 166.

The fourth clip plate 144 is a roughly disk shaped structure. The fourth clip plate 144 is a rigid structure. The fourth clip plate 144 forms a stop structure. The fourth clip plate 144 prevents the individual remote control device associated with the second clip structure 122 from shifting off the first face 111 in a direction parallel to the major axis of the base disk structure 101. The fourth clip plate 144 attaches to the base disk structure 101 such that the congruent ends of the disk structure of the fourth clip plate 144 are roughly perpendicular to the major axis of the base disk structure 101. The fourth clip plate 144 is the clip plate of the second clip structure 122 that is proximal to the fourth lateral face 134 of the base disk structure 101.

The fifth clip plate 145 is a roughly disk shaped structure. The fifth clip plate 145 is a rigid structure. The fifth clip plate 145 forms a stop structure. The fifth clip plate 145 prevents the individual remote control device associated with the second clip structure 122 from shifting off the first face 111 in a direction parallel to the minor axis of the base disk structure 101. The fifth clip plate 145 presses against the associated individual remote control device such that a friction is formed between the second clip structure 122 and the associated individual remote control device. The friction between the fifth clip plate 145 and the associated individual remote control device prevents the associated individual remote control device form shifting along the first face 111 in a direction parallel to the major axis of the base disk structure 101. The fifth clip plate 145 attaches to the base disk structure 101 such that the congruent ends of the disk structure of the fifth clip plate 145 are roughly perpendicular to the minor axis of the base disk structure 101. The fifth clip plate 145 is the clip plate of the second clip structure 122 that is proximal to the first lateral face 131 of the base disk structure 101.

The sixth clip plate 146 is a roughly disk shaped structure. The sixth clip plate 146 is a rigid structure. The sixth clip plate 146 forms a stop structure. The sixth clip plate 146 prevents the individual remote control device associated with the second clip structure 122 from shifting off the first face 111 in a direction parallel to the minor axis of the base disk structure 101. The sixth clip plate 146 presses against the associated individual remote control device such that a friction is formed between the second clip structure 122 and the associated individual remote control device. The friction between the sixth clip plate 146 and the associated individual remote control device prevents the associated individual remote control device form shifting along the first face 111 in a direction parallel to the major axis of the base disk structure 101. The sixth clip plate 146 attaches to the base disk structure 101 such that the congruent ends of the disk structure of the sixth clip plate 146 are roughly perpendicular to the minor axis of the base disk structure 101. The sixth clip plate 146 is the clip plate of the second clip structure 122 that is proximal to the third lateral face 133 of the base disk structure 101.

The fourth clip arm 164 is a prism shaped structure. The fourth clip arm 164 is a rigid structure. The fourth clip arm is a spring loaded structure. The fourth clip arm 164 attaches the fourth clip plate 144 to the second lateral face 132 of the base disk structure 101. The fourth clip arm 164 attaches to the fourth clip plate 144 such that the fourth clip arm 164 deforms as the span of the distance between the fourth clip plate 144 and the second lateral face 132 increases.

The fifth clip arm 165 is a prism shaped structure. The fifth clip arm 165 is a rigid structure. The fifth clip arm 165 is a spring loaded structure. The fifth clip arm 165 attaches the fifth clip plate 145 to the first lateral face 131 of the base disk structure 101. The fifth clip arm 165 attaches to the fifth clip plate 145 such that the fifth clip arm 165 deforms as the span of the distance between the fifth clip plate 145 and the first lateral face 131 increases.

The sixth clip arm 166 is a prism shaped structure. The sixth clip arm 166 is a rigid structure. The sixth clip arm 166 is a spring loaded structure. The sixth clip arm 166 attaches the sixth clip plate 146 to the third lateral face 133 of the base disk structure 101. The sixth clip arm 166 attaches to the sixth clip plate 146 such that the sixth clip arm 166 deforms as the span of the distance between the sixth clip plate 146 and the third lateral face 133 increases.

The third clip structure 123 is an individual clip structure selected from the plurality of clip structures 102. The third clip structure 123 is associated with an individual remote control device selected from the plurality of remote control devices 180. The third clip structure 123 is a friction based structure that clips its associated individual remote 18 control device to the second face 112 of the base disk structure 101. The third clip structure 123 comprises a seventh clip plate 147, an eighth clip plate 148, a ninth clip plate 149, a seventh clip arm 167, an eighth clip arm 168, and a ninth clip arm 169.

The seventh clip plate 147 is a roughly disk shaped structure. The seventh clip plate 147 is a rigid structure. The seventh clip plate 147 forms a stop structure. The seventh clip plate 147 prevents the individual remote control device associated with the third clip structure 123 from shifting off the second face 112 in a direction parallel to the major axis of the base disk structure 101. The seventh clip plate 147 attaches to the base disk structure 101 such that the congruent ends of the disk structure of the seventh clip plate 147 are roughly perpendicular to the major axis of the base disk structure 101. The seventh clip plate 147 is the clip plate of the third clip structure 123 that is proximal to the second lateral face 132 of the base disk structure 101.

The eighth clip plate 148 is a roughly disk shaped structure. The eighth clip plate 148 is a rigid structure. The eighth clip plate 148 forms a stop structure. The eighth clip plate 148 prevents the individual remote control device associated with the third clip structure 123 from shifting off the second face 112 in a direction parallel to the minor axis of the base disk structure 101. The eighth clip plate 148 presses against the associated individual remote control device such that a friction is formed between the third clip structure 123 and the associated individual remote control device. The friction between the eighth clip plate 148 and the associated individual remote control device prevents the associated individual remote control device form shifting along the second face 112 in a direction parallel to the major axis of the base disk structure 101.

The eighth clip plate 148 attaches to the base disk structure 101 such that the congruent ends of the disk structure of the eighth clip plate 148 are roughly perpendicular to the minor axis of the base disk structure 101. The eighth clip plate 148 is the clip plate of the third clip structure 123 that is proximal to the first lateral face 131 of the base disk structure 101.

The ninth clip plate 149 is a roughly disk shaped structure. The ninth clip plate 149 is a rigid structure. The ninth clip plate 149 forms a stop structure. The ninth clip plate 149 prevents the individual remote control device associated with the third clip structure 123 from shifting off the second face 112 in a direction parallel to the minor axis of the base disk structure 101. The ninth clip plate 149 presses against the associated individual remote control device such that a friction is formed between the third clip structure 123 and the associated individual remote control device. The friction between the ninth clip plate 149 and the associated individual remote control device prevents the associated individual remote control device form shifting along the second face 112 in a direction parallel to the major axis of the base disk structure 101. The ninth clip plate 149 attaches to the base disk structure 101 such that the congruent ends of the disk structure of the ninth clip plate 149 are roughly perpendicular to the minor axis of the base disk structure 101. The ninth clip plate 149 is the clip plate of the third clip structure 123 that is proximal to the third lateral face 133 of the base disk structure 101.

The seventh clip arm 167 is a prism shaped structure. The seventh clip arm 167 is a rigid structure. The seventh clip arm 167 is a spring loaded structure. The seventh clip arm 167 attaches the seventh clip plate 147 to the second lateral face 132 of the base disk structure 101. The seventh clip arm 167 attaches to the seventh clip plate 147 such that the seventh clip arm 167 deforms as the span of the distance between the seventh clip plate 147 and the second lateral face 132 increases.

The eighth clip arm 168 is a prism shaped structure. The eighth clip arm 168 is a rigid structure. The eighth clip arm 168 is a spring loaded structure. The eighth clip arm 168 attaches the eighth clip plate 148 to the first lateral face 131 of the base disk structure 101. The eighth clip arm 168 attaches to the eighth clip plate 148 such that the eighth clip arm 168 deforms as the span of the distance between the eighth clip plate 148 and the first lateral face 131 increases.

The ninth clip arm 169 is a prism shaped structure. The ninth clip arm 169 is a rigid structure. The ninth clip arm 169 is a spring loaded structure. The ninth clip arm 169 attaches the ninth clip plate 149 to the third lateral face 133 of the base disk structure 101. The ninth clip arm 169 attaches to the ninth clip plate 149 such that the ninth clip arm 169 deforms as the span of the distance between the ninth clip plate 149 and the third lateral face 133 increases.

The fourth clip structure 124 is an individual clip structure selected from the plurality of clip structures 102. The fourth clip structure 124 is associated with an individual remote control device selected from the plurality of remote control devices 180. The fourth clip structure 124 is a friction based structure that clips its associated individual remote control device to the second face 112 of the base disk structure 101. The fourth clip structure 124 comprises a tenth clip plate 150, an eleventh clip plate 151, a twelfth clip plate 152, a tenth clip arm 170, an eleventh clip arm 171, and a twelfth clip arm 172.

The tenth clip plate 150 is a roughly disk shaped structure. The tenth clip plate 150 is a rigid structure. The tenth clip plate 150 forms a stop structure. The tenth clip plate 150 prevents the individual remote control device associated with the fourth clip structure 124 from shifting off the second face 112 in a direction parallel to the major axis of the base disk structure 101. The tenth clip plate 150 attaches to the base disk structure 101 such that the congruent ends of the disk structure of the tenth clip plate 150 are roughly perpendicular to the major axis of the base disk structure 101. The tenth clip plate 150 is the clip plate of the fourth clip structure 124 that is proximal to the fourth lateral face 134 of the base disk structure 101.

The eleventh clip plate 151 is a roughly disk shaped structure. The eleventh clip plate 151 is a rigid structure. The eleventh clip plate 151 forms a stop structure. The eleventh clip plate 151 prevents the individual remote control device associated with the fourth clip structure 124 from shifting off the second face 112 in a direction parallel to the minor axis of the base disk structure 101. The eleventh clip plate 151 presses against the associated individual remote control device such that a friction is formed between the fourth clip structure 124 and the associated individual remote control device. The friction between the eleventh clip plate 151 and the associated individual remote control device prevents the associated individual remote control device form shifting along the second face 112 in a direction parallel to the major axis of the base disk structure 101. The eleventh clip plate 151 attaches to the base disk structure 101 such that the congruent ends of the disk structure of the eleventh clip plate 151 are roughly perpendicular to the minor axis of the base disk structure 101. The eleventh clip plate 151 is the clip plate of the fourth clip structure 124 that is proximal to the first lateral face 131 of the base disk structure 101.

The twelfth clip plate 152 is a roughly disk shaped structure. The twelfth clip plate 152 is a rigid structure. The twelfth clip plate 152 forms a stop structure. The twelfth clip plate 152 prevents the individual remote control device associated with the fourth clip structure 124 from shifting off the second face 112 in a direction parallel to the minor axis of the base disk structure 101. The twelfth clip plate 152 presses against the associated individual remote control device such that a friction is formed between the fourth clip structure 124 and the associated individual remote control device. The friction between the twelfth clip plate 152 and the associated individual remote control device prevents the associated individual remote control device form shifting along the second face 112 in a direction parallel to the major axis of the base disk structure 101. The twelfth clip plate 152 attaches to the base disk structure 101 such that the congruent ends of the disk structure of the twelfth clip plate 152 are roughly perpendicular to the minor axis of the base disk structure 101. The twelfth clip plate 152 is the clip plate of the fourth clip structure 124 that is proximal to the third lateral face 133 of the base disk structure 101.

The tenth clip arm 170 is a prism shaped structure. The tenth clip arm 170 is a rigid structure. The tenth clip arm 170 is a spring loaded structure. The tenth clip arm 170 attaches the tenth clip plate 150 to the second lateral face 132 of the base disk structure 101. The tenth clip arm 170 attaches to the tenth clip plate 150 such that the tenth clip arm 170 deforms as the span of the distance between the tenth clip plate 150 and the second lateral face 132 increases.

The eleventh clip arm 171 is a prism shaped structure. The eleventh clip arm 171 is a rigid structure. The eleventh clip arm 171 is a spring loaded structure. The eleventh clip arm 171 attaches the eleventh clip plate 151 to the first lateral face 131 of the base disk structure 101. The eleventh clip arm 171 attaches to the eleventh clip plate 151 such that the eleventh clip arm 171 deforms as the span of the distance between the eleventh clip plate 151 and the first lateral face 131 increases.

The twelfth clip arm 172 is a prism shaped structure. The twelfth clip arm 172 is a rigid structure. The twelfth clip arm 172 is a spring loaded structure. The twelfth clip arm 172 attaches the twelfth clip plate 152 to the third lateral face 133 of the base disk structure 101. The twelfth clip arm 172 attaches to the twelfth clip plate 152 such that the twelfth clip arm 172 deforms as the span of the distance between the twelfth clip plate 152 and the third lateral face 133 increases.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Associate: As used in this disclosure, the term associate is used to describe a relationship between a first object and a second object. The use of the term associated implies both: a) that the first object works with the second object in order to accomplish a task necessary for the implementation of the invention (such as joining two objects together); and, b) the relationship remains stable through the accomplishment of the task. By stable is meant that neither the first object or the second object are intended to be interchanged with a third object during the use of the invention.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clip: As used in this disclosure, a clip is a fastening device that attaches to an anchor structure. The clip is an elastic structure that grips the anchor structure such that the anchor structure deforms the clip. The anchor structure prevents the clip from returning to its relaxed position such that the clip applies a pressure to the anchor structure. By grip is meant that the pressure applied by the clip to the anchor point ensures that clip attaches to the anchor structure with a tight fit.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Extensible: As used in this disclosure, extensible is an adjective that describes an object made of sections that fit or together such that the object can be made longer or shorter by adjusting the relative positions of the sections.

Exterior: As used in this disclosure, the exterior is used as a relational term that implies that an object is not contained within the boundary of a structure or a space.

Flexible: As used in this disclosure, flexible refers to an object or material that will deform when a force is applied to it but that will not necessarily return to its original shape when the deforming force is removed.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Fitted: As used in this disclosure, the term fitted refers to two geometrically similar structures wherein the smaller geometrically similar structure inserts into the larger geometrically similar structure.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Grip: As used in this disclosure, a grip is an accommodation formed on or within an object that allows the object to be grasped or manipulated by a hand.

Handheld: As used in this disclosure, when referring to an item or device, handheld means that the item or device is small and light enough to be operated while a person holds the item or device in their hands.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inelastic Nature: As used in this disclosure, an inelastic nature refers to a flexible structure that maintains its new shape after the flexible structure has been deformed.

Inferior: As used in this disclosure, the term inferior refers to a directional reference that is parallel to and in the same direction as the force of gravity when an object is positioned or used normally.

Interface: As used in this disclosure, an interface is a physical or virtual boundary that separates two different systems and across which information is exchanged.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Major and Minor Axes: As used in this disclosure, the major and minor axes refer to a pair of perpendicular axes that are defined within a structure. The length of the major axis is always greater than or equal to the length of the minor axis. The major axis forms the longest symmetric bifurcation of a structure selected from the group consisting of: a) the structure; or, b) the perimetrical boundary of the structure. The major and minor axes intersect at the center of the structure. The major axis is always parallel or perpendicular to an edge of a rectangular or rectilinear structure.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rectangle: As used in this disclosure, a rectangle is an enclosed four sided geometric structure. Each angle formed by the rectangle is a right angle. A non-Euclidean rectangle is a rectangle that is formed on a non-Euclidean plane.

Rectangular Block: As used in this disclosure, a rectangular block refers to a three-dimensional prism structure comprising six rectangular surfaces (commonly called faces) formed at right angles. Within this disclosure, a rectangular block may further comprise rounded edges and corners.

Relaxed Shape: As used in this disclosure, a structure is considered to be in its relaxed state when no shear, strain, or torsional forces are being applied to the structure.

Remote Control: As used in this disclosure, remote control means the establishment of control of a device from a distance. Remote control is generally accomplished through the use of an electrical device that generates electrically based control signals that are transmitted via radio frequencies or other means to the device.

Roughly: As used in this disclosure, roughly refers to a comparison between two objects. Roughly means that the difference between one or more parameters of the two compared objects are not significantly different.

Space, Area, and Volume: As used in this disclosure, space refers to a multi-dimensional region (often two dimensional or three dimensional) within which: a) a directional structure (or reference) can be established; b) a measure of distance can be established; and, c) the relative position between two or more objects can be established. The term area refers to a two dimensional space. An area, often called the surface area, is a measure of the size of an object in the two dimensional space. The term volume refers to a three dimensional space. A volume is a measure of the size of an object in the three dimensional space. The measure of the area and the volume are dependent on the measure of the distance and the directional structure of the associated space.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Stop: As used in this disclosure, a stop is a mechanical structure that blocks the motion of an object along a track. The stop is used to limit the range of motion of the object.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Telescopic: As used in this disclosure, telescopic is an adjective that describes a composite prism structure made of hollow prism-shaped sections that fit or slide into each other such that the center axis of the composite prism structure can be made longer or shorter by adjusting the relative positions of the hollow prism-shaped sections.

Tight Fit: As used in this disclosure, a tight fit refers to the insertion of a first object into a second object such that there is not a lot of space between the first object and the second object. By not a lot of space is meant that friction occurs when the first object moves within the second object.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A remote control holder comprising
a base disk structure and a plurality of clip structures;
wherein the plurality of clip structures mount on the base disk structure;
wherein the remote control holder is configured for use with a plurality of remote control devices;
wherein the plurality of remote control devices removably attach to the remote control holder;

wherein the remote control holder stores the plurality of remote control devices such that an interface of each remote control selected from a plurality of control devices is accessible from an environment;
wherein the plurality of clip structures comprises a first clip structure, a second clip structure, a third clip structure, and a fourth clip structure;
wherein the first clip structure is a friction based structure that clips its associated individual remote control device to a first face of the base disk structure;
wherein the base disk structure comprises a first face, a second face, and a plurality of lateral faces;
wherein up to two individual remote control devices selected from the plurality of remote control devices that are attached to the base disk structure are placed against the first face;
wherein the first clip structure comprises a first clip plate, a second clip plate, a third clip plate, a first clip arm, a second clip arm, and a third clip arm;
wherein the first clip plate prevents an individual remote control device of the plurality of remote control devices associated with the first clip structure from shifting off the first face in a direction parallel to a major axis of the base disk structure;
wherein the remote control holder is a mechanical device;
wherein the remote control holder is a handheld device;
wherein the plurality of clip structures removably attach the plurality of remote control devices to the base disk structure;
wherein the base disk structure is the primary structure of the remote control holder;
wherein the plurality of clip structures mount on the base disk structure;
wherein the plurality of clip structures removably attach the plurality of remote control devices to the base disk structure;
wherein the base disk structure has a disk shape;
wherein the base disk structure is a rigid structure;
wherein the base disk structure has a rectangular block shape;
wherein the plurality of clip structures comprises a collection of individual clip structures;
wherein each individual clip structure selected from the plurality of clip structures is a fastening device;
wherein each selected individual clip structure is a clip;
wherein each selected individual clip structure is associated with an individual remote control device selected from the plurality of remote control devices;
wherein each selected individual clip structure secures its associated individual remote control device to the base disk structure;
wherein each individual remote control device selected from the plurality of remote control devices inserts into its associated individual clip structure with a tight fit;
wherein each selected individual clip structure detachably attaches its associated individual remote control device to the base disk structure;
wherein the first clip structure is an individual clip structure selected from the plurality of clip structures;
wherein the first clip structure is associated with an individual remote control device selected from the plurality of remote control devices;
wherein the second clip structure is an individual clip structure selected from the plurality of clip structures;
wherein the second clip structure is associated with an individual remote control device selected from the plurality of remote control devices;
wherein the second clip structure is a friction based structure that clips its associated individual remote control device to the first face of the base disk structure;
wherein the third clip structure is an individual clip structure selected from the plurality of clip structures;
wherein the third clip structure is associated with an individual remote control device selected from the plurality of remote control devices;
wherein the third clip structure is a friction based structure that clips its associated individual remote control device to the second face of the base disk structure;
wherein the fourth clip structure is an individual clip structure selected from the plurality of clip structures;
wherein the fourth clip structure is associated with an individual remote control device selected from the plurality of remote control devices;
wherein the fourth clip structure is a friction based structure that clips its associated individual remote control device to the second face of the base disk structure;
wherein the first face is a congruent end of the disk shape of the base disk structure;
wherein the first face forms the face of the base disk structure with the greatest surface area;
wherein the second face is a congruent end of the disk shape of the base disk structure;
wherein the second face forms the face of the base disk structure that is distal from the first face;
wherein up to two individual remote control devices selected from the plurality of remote control devices that are attached to the base disk structure are placed against the second face;
wherein the plurality of lateral faces forms the lateral face of the disk shape of the base disk structure;
wherein the plurality of lateral faces further comprises a first lateral face, a second lateral face, a third lateral face, and a fourth lateral face;
wherein the first lateral face is a lateral face of the disk structure of the base disk structure;
wherein the first lateral face is the lateral face of the base disk structure with the greatest surface area;
wherein the first lateral face runs parallel with the major axis of the base disk structure;
wherein the second lateral face is a lateral face of the disk structure of the base disk structure;
wherein the second lateral face is the lateral face of the base disk structure with the least surface area;
wherein the second lateral face runs perpendicular to the major axis of the base disk structure;
wherein the third lateral face is a lateral face of the disk structure of the base disk structure;
wherein the third lateral face is the lateral face selected from the plurality of lateral faces that is distal from the first lateral face;
wherein the third lateral face runs parallel with the major axis of the base disk structure;
wherein the fourth lateral face is a lateral face of the disk structure of the base disk structure;
wherein the fourth lateral face is the lateral face selected from the plurality of lateral faces that is distal from the second lateral face;
wherein the fourth lateral face runs perpendicular to the major axis of the base disk structure.

2. The remote control holder according to claim 1
wherein the first clip plate is a roughly disk shaped structure;
wherein the first clip plate is a rigid structure;

wherein the first clip plate forms a stop structure;
wherein the first clip plate attaches to the base disk structure such that the congruent ends of the disk structure of the first clip plate are roughly perpendicular to the major axis of the base disk structure;
wherein the first clip plate is the clip plate of the first clip structure that is proximal to the second lateral face of the base disk structure;
wherein the second clip plate is a roughly disk shaped structure;
wherein the second clip plate is a rigid structure;
wherein the second clip plate forms a stop structure;
wherein the second clip plate prevents the individual remote control device associated with the first clip structure from shifting off the first face in a direction parallel to the minor axis of the base disk structure;
wherein the second clip plate presses against the associated individual remote control device such that a friction is formed between the first clip structure and the associated individual remote control device;
wherein the friction between the second clip plate and the associated individual remote control device prevents the associated individual remote control device form shifting along the first face in a direction parallel to the major axis of the base disk structure;
wherein the second clip plate attaches to the base disk structure such that the congruent ends of the disk structure of the second clip plate are roughly perpendicular to the minor axis of the base disk structure;
wherein the second clip plate is the clip plate of the first clip structure that is proximal to the first lateral face of the base disk structure;
wherein the third clip plate is a roughly disk shaped structure;
wherein the third clip plate is a rigid structure;
wherein the third clip plate forms a stop structure;
wherein the third clip plate prevents the individual remote control device associated with the first clip structure from shifting off the first face in a direction parallel to the minor axis of the base disk structure;
wherein the third clip plate presses against the associated individual remote control device such that a friction is formed between the first clip structure and the associated individual remote control device;
wherein the friction between the third clip plate and the associated individual remote control device prevents the associated individual remote control device form shifting along the first face in a direction parallel to the major axis of the base disk structure;
wherein the third clip plate attaches to the base disk structure such that the congruent ends of the disk structure of the third clip plate are roughly perpendicular to the minor axis of the base disk structure;
wherein the third clip plate is the clip plate of the first clip structure that is proximal to the third lateral face of the base disk structure;
wherein the first clip arm is a rigid structure;
wherein the first clip arm is a spring loaded structure;
wherein the first clip arm attaches the first clip plate to the second lateral face of the base disk structure;
wherein the first clip arm attaches to the first clip plate such that the first clip arm deforms as the span of the distance between the first clip plate and the second lateral face increases;
wherein the second clip arm is a rigid structure;
wherein the second clip arm is a spring loaded structure;

wherein the second clip arm attaches the second clip plate to the first lateral face of the base disk structure;
wherein the second clip arm attaches to the second clip plate such that the second clip arm deforms as the span of the distance between the second clip plate and the first lateral face increases;
wherein the third clip arm is a rigid structure;
wherein the third clip arm is a spring loaded structure;
wherein the third clip arm attaches the third clip plate to the third lateral face of the base disk structure;
wherein the third clip arm attaches to the third clip plate such that the third clip arm deforms as the span of the distance between the third clip plate and the third lateral face increases.

3. The remote control holder according to claim 2
wherein the second clip structure comprises a fourth clip plate, a fifth clip plate, a sixth clip plate, a fourth clip arm, a fifth clip arm, and a sixth clip arm;
wherein the fourth clip plate is a roughly disk shaped structure;
wherein the fourth clip plate is a rigid structure;
wherein the fourth clip plate forms a stop structure;
wherein the fourth clip plate prevents the individual remote control device associated with the second clip structure from shifting off the first face in a direction parallel to the major axis of the base disk structure;
wherein the fourth clip plate attaches to the base disk structure such that the congruent ends of the disk structure of the fourth clip plate are roughly perpendicular to the major axis of the base disk structure;
wherein the fourth clip plate is the clip plate of the second clip structure that is proximal to the fourth lateral face of the base disk structure;
wherein the fifth clip plate is a roughly disk shaped structure;
wherein the fifth clip plate is a rigid structure;
wherein the fifth clip plate forms a stop structure;
wherein the fifth clip plate prevents the individual remote control device associated with the second clip structure from shifting off the first face in a direction parallel to the minor axis of the base disk structure;
wherein the fifth clip plate presses against the associated individual remote control device such that a friction is formed between the second clip structure and the associated individual remote control device;
wherein the friction between the fifth clip plate and the associated individual remote control device prevents the associated individual remote control device form shifting along the first face in a direction parallel to the major axis of the base disk structure;
wherein the fifth clip plate attaches to the base disk structure such that the congruent ends of the disk structure of the fifth clip plate are roughly perpendicular to the minor axis of the base disk structure;
wherein the fifth clip plate is the clip plate of the second clip structure that is proximal to the first lateral face of the base disk structure;
wherein the sixth clip plate is a roughly disk shaped structure;
wherein the sixth clip plate is a rigid structure;
wherein the sixth clip plate forms a stop structure;
wherein the sixth clip plate prevents the individual remote control device associated with the second clip structure from shifting off the first face in a direction parallel to the minor axis of the base disk structure;
wherein the sixth clip plate presses against the associated individual remote control device such that a friction is formed between the second clip structure and the associated individual remote control device;

wherein the friction between the sixth clip plate and the associated individual remote control device prevents the associated individual remote control device form shifting along the first face in a direction parallel to the major axis of the base disk structure;

wherein the sixth clip plate attaches to the base disk structure such that the congruent ends of the disk structure of the sixth clip plate are roughly perpendicular to the minor axis of the base disk structure;

wherein the sixth clip plate is the clip plate of the second clip structure that is proximal to the third lateral face of the base disk structure;

wherein the fourth clip arm is a rigid structure;

wherein the fourth clip arm is a spring loaded structure;

wherein the fourth clip arm attaches the fourth clip plate to the second lateral face of the base disk structure;

wherein the fourth clip arm attaches to the fourth clip plate such that the fourth clip arm deforms as the span of the distance between the fourth clip plate and the second lateral face increases;

wherein the fifth clip arm is a rigid structure;

wherein the fifth clip arm is a spring loaded structure;

wherein the fifth clip arm attaches the fifth clip plate to the first lateral face of the base disk structure;

wherein the fifth clip arm attaches to the fifth clip plate such that the fifth clip arm deforms as the span of the distance between the fifth clip plate and the first lateral face increases;

wherein the sixth clip arm is a rigid structure;

wherein the sixth clip arm is a spring loaded structure;

wherein the sixth clip arm attaches the sixth clip plate to the third lateral face of the base disk structure;

wherein the sixth clip arm attaches to the sixth clip plate such that the sixth clip arm deforms as the span of the distance between the sixth clip plate and the third lateral face increases.

4. The remote control holder according to claim 3 wherein the third clip structure comprises a seventh clip plate, an eighth clip plate, a ninth clip plate, a seventh clip arm, an eighth clip arm, and a ninth clip arm;

wherein the seventh clip plate is a roughly disk shaped structure;

wherein the seventh clip plate is a rigid structure;

wherein the seventh clip plate forms a stop structure;

wherein the seventh clip plate prevents the individual remote control device associated with the third clip structure from shifting off the second face in a direction parallel to the major axis of the base disk structure;

wherein the seventh clip plate attaches to the base disk structure such that the congruent ends of the disk structure of the seventh clip plate are roughly perpendicular to the major axis of the base disk structure;

wherein the seventh clip plate is the clip plate of the third clip structure that is proximal to the second lateral face of the base disk structure;

wherein the eighth clip plate is a roughly disk shaped structure;

wherein the eighth clip plate is a rigid structure;

wherein the eighth clip plate forms a stop structure;

wherein the eighth clip plate prevents the individual remote control device associated with the third clip structure from shifting off the second face in a direction parallel to the minor axis of the base disk structure;

wherein the eighth clip plate presses against the associated individual remote control device such that a friction is formed between the third clip structure and the associated individual remote control device;

wherein the friction between the eighth clip plate and the associated individual remote control device prevents the associated individual remote control device form shifting along the second face in a direction parallel to the major axis of the base disk structure;

wherein the eighth clip plate attaches to the base disk structure such that the congruent ends of the disk structure of the eighth clip plate are roughly perpendicular to the minor axis of the base disk structure;

wherein the eighth clip plate is the clip plate of the third clip structure that is proximal to the first lateral face of the base disk structure;

wherein the ninth clip plate is a roughly disk shaped structure;

wherein the ninth clip plate is a rigid structure;

wherein the ninth clip plate forms a stop structure;

wherein the ninth clip plate prevents the individual remote control device associated with the third clip structure from shifting off the second face in a direction parallel to the minor axis of the base disk structure;

wherein the ninth clip plate presses against the associated individual remote control device such that a friction is formed between the third clip structure and the associated individual remote control device;

wherein the friction between the ninth clip plate and the associated individual remote control device prevents the associated individual remote control device form shifting along the second face in a direction parallel to the major axis of the base disk structure;

wherein the ninth clip plate attaches to the base disk structure such that the congruent ends of the disk structure of the ninth clip plate are roughly perpendicular to the minor axis of the base disk structure;

wherein the ninth clip plate is the clip plate of the third clip structure that is proximal to the third lateral face of the base disk structure;

wherein the seventh clip arm is a rigid structure;

wherein the seventh clip arm is a spring loaded structure;

wherein the seventh clip arm attaches the seventh clip plate to the second lateral face of the base disk structure;

wherein the seventh clip arm attaches to the seventh clip plate such that the seventh clip arm deforms as the span of the distance between the seventh clip plate and the second lateral face increases;

wherein the eighth clip arm is a rigid structure;

wherein the eighth clip arm is a spring loaded structure;

wherein the eighth clip arm attaches the eighth clip plate to the first lateral face of the base disk structure;

wherein the eighth clip arm attaches to the eighth clip plate such that the eighth clip arm deforms as the span of the distance between the eighth clip plate and the first lateral face increases;

wherein the ninth clip arm is a rigid structure;

wherein the ninth clip arm is a spring loaded structure;

wherein the ninth clip arm attaches the ninth clip plate to the third lateral face of the base disk structure;

wherein the ninth clip arm attaches to the ninth clip plate such that the ninth clip arm deforms as the span of the distance between the ninth clip plate and the third lateral face increases.

5. The remote control holder according to claim 4 wherein the fourth clip structure comprises a tenth clip plate, an eleventh clip plate, a twelfth clip plate, a tenth clip arm, an eleventh clip arm, and a twelfth clip arm;

wherein the tenth clip plate is a roughly disk shaped structure;
wherein the tenth clip plate is a rigid structure;
wherein the tenth clip plate forms a stop structure;
wherein the tenth clip plate prevents the individual remote control device associated with the fourth clip structure from shifting off the second face in a direction parallel to the major axis of the base disk structure;
wherein the tenth clip plate attaches to the base disk structure such that the congruent ends of the disk structure of the tenth clip plate are roughly perpendicular to the major axis of the base disk structure;
wherein the tenth clip plate is the clip plate of the fourth clip structure that is proximal to the fourth lateral face of the base disk structure;
wherein the eleventh clip plate is a roughly disk shaped structure;
wherein the eleventh clip plate is a rigid structure;
wherein the eleventh clip plate forms a stop structure;
wherein the eleventh clip plate prevents the individual remote control device associated with the fourth clip structure from shifting off the second face in a direction parallel to the minor axis of the base disk structure;
wherein the eleventh clip plate presses against the associated individual remote control device such that a friction is formed between the fourth clip structure and the associated individual remote control device;
wherein the friction between the eleventh clip plate and the associated individual remote control device prevents the associated individual remote control device form shifting along the second face in a direction parallel to the major axis of the base disk structure;
wherein the eleventh clip plate attaches to the base disk structure such that the congruent ends of the disk structure of the eleventh clip plate are roughly perpendicular to the minor axis of the base disk structure;
wherein the eleventh clip plate is the clip plate of the fourth clip structure that is proximal to the first lateral face of the base disk structure;
wherein the twelfth clip plate is a roughly disk shaped structure;
wherein the twelfth clip plate is a rigid structure;
wherein the twelfth clip plate forms a stop structure;
wherein the twelfth clip plate prevents the individual remote control device associated with the fourth clip structure from shifting off the second face in a direction parallel to the minor axis of the base disk structure;
wherein the twelfth clip plate presses against the associated individual remote control device such that a friction is formed between the fourth clip structure and the associated individual remote control device;
wherein the friction between the twelfth clip plate and the associated individual remote control device prevents the associated individual remote control device form shifting along the second face in a direction parallel to the major axis of the base disk structure;
wherein the twelfth clip plate attaches to the base disk structure such that the congruent ends of the disk structure of the twelfth clip plate are roughly perpendicular to the minor axis of the base disk structure;
wherein the twelfth clip plate is the clip plate of the fourth clip structure that is proximal to the third lateral face of the base disk structure;
wherein the tenth clip arm is a rigid structure;
wherein the tenth clip arm is a spring loaded structure;
wherein the tenth clip arm attaches the tenth clip plate to the second lateral face of the base disk structure;
wherein the tenth clip arm attaches to the tenth clip plate such that the tenth clip arm deforms as the span of the distance between the tenth clip plate and the second lateral face increases;
wherein the eleventh clip arm is a rigid structure;
wherein the eleventh clip arm is a spring loaded structure;
wherein the eleventh clip arm attaches the eleventh clip plate to the first lateral face of the base disk structure;
wherein the eleventh clip arm attaches to the eleventh clip plate such that the eleventh clip arm deforms as the span of the distance between the eleventh clip plate and the first lateral face increases;
wherein the twelfth clip arm is a rigid structure;
wherein the twelfth clip arm is a spring loaded structure;
wherein the twelfth clip arm attaches the twelfth clip plate to the third lateral face of the base disk structure;
wherein the twelfth clip arm attaches to the twelfth clip plate such that the twelfth clip arm deforms as the span of the distance between the twelfth clip plate and the third lateral face increases.

\* \* \* \* \*